Oct. 2, 1928.
J. COURNAND ET AL
1,685,984
SYRINGE
Filed March 5, 1926
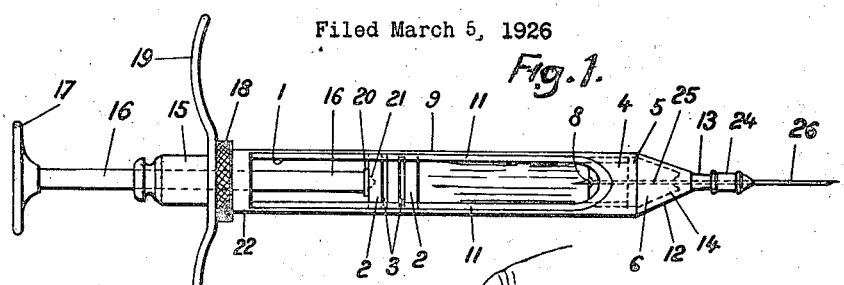
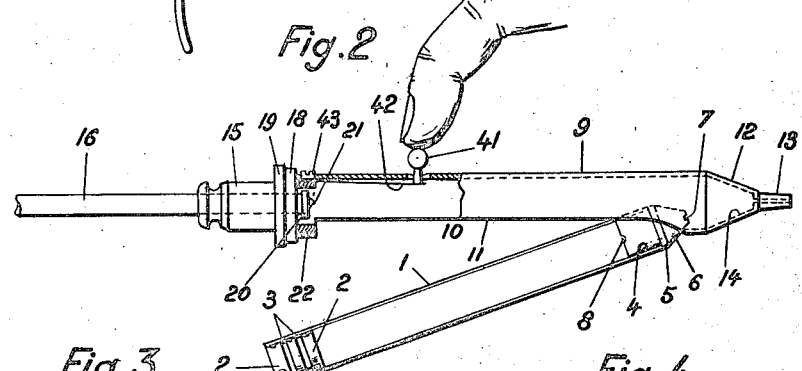
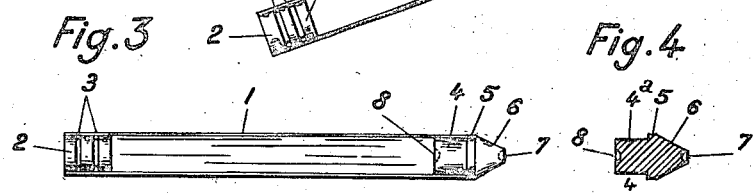
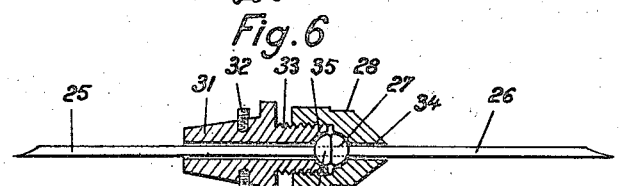
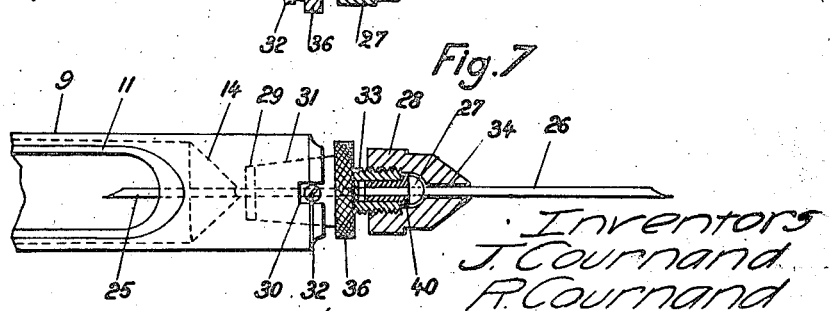
Inventors
J. Cournand
R. Cournand
by Langner, Parry, Card & Langner
Atty's Patented Oct. 2, 1928.

1,685,984

UNITED STATES PATENT OFFICE.

JULES COURNAND AND RENÉ COURNAND, OF PARIS, FRANCE.

SYRINGE.

Application filed March 5, 1926, Serial No. 92,559, and in France March 17, 1925.

This invention has reference to the type of syringes wherein the liquid to be injected is sheltered from any contamination in a container formed by an elongated tube or capsule preferably made of glass obturated at each of its ends by a separate resilient tight stopper, said tube or capsule being accommodated within a suitably sized and shaped recess formed in the body of the syringe so as to permit easy insertion thereof for use and easy removal thereof after use, one of said stoppers being adapted to be perforated right through by the hollow needle which injects the liquid into the tissue or like part whereas the other stopper acts as a liquid-tight piston which is shifted gradually by the motion of the syringe rod.

According to the invention, there is provided an improved syringe of this type wherein the width of the entrance of the recess formed in the syringe body is slightly larger than the diameter of the capsule and that its length is slightly smaller than the length of the capsule, further by the fact that the fore extremity of said recess is convergently for example frustoconically shaped for snugly resiliently housing the similarly shaped fore part of a soft and resilient stopper obturating the fore end of the said capsule, whereby the latter is yieldingly held in self centered operating position in said recess. whilst being readily insertable thereinto and removable therefrom.

According to the invention moreover, the fore stopper thus shaped may have a kerf extending longitudinally over a portion of its length and may be slightly recessed centrally at each of its ends, one of its recesses being formed in the central part of its cylindrical plane surface while the other recess is formed in the smaller base of the frustum. The first recess serves for guiding and accommodating the inner point of the needle; the second one serves for facilitating the axial perforation of the said needle. The convergent, for example frustoconical shape of the fore part of this fore resilient stopper moreover ensures the automatic centering of the capsule within the correspondingly shaped part of the syringe recess or chamber adapted for receiving said capsule. Furthermore said part thus shaped portion allows of a certain compression of the fore stopper to take place whereby the correct positioning of the capsule into said chamber is rendered easier. Lastly, thanks to the compressibility of said stopper, the capsule is accurately and securely held in the correct axial position that it must occupy in the syringe.

A further feature of the improved syringe according to the invention resides in a novel arrangement of its body portion and particularly of the recess or chamber within which the capsule must be inserted home, such novel construction ensuring that the longitudinal axis of said capsule will coincide with the axis of the syringe rod, thanks to the convergent, for example cylindro-frustoconical shape of the fore stopper obturating the capsule.

A still further feature of the improved syringe according to the invention resides in a novel arrangement of the nozzle adapted for receiving a special needle-holder whereby it becomes possible to utilize the usual interchangeable dental needles.

Other features and advantages of the improved syringe according to the invention will incidentally appear in the following description.

In the accompanying drawing illustrating, by way of example, an embodiment of the invention:—

Fig. 1 shows in longitudinal elevation the syringe provided with the twin-point needle, said syringe being viewed from the side corresponding to the rectangular entrance of the elongated recess formed in its body for accommodating the capsule, the latter being shown in operating position therein and the syringe rod being shown partly engaged into same in the act of performing the injection.

Fig. 2 shows in elevation and partial longitudinal section at right angles to Fig. 1 the same syringe, assuming the needle to have been removed, this view representing the position occupied by the capsule having its fore end obturated by the cylindro-frustoconical stopper when about to be inserted home into the frustoconical fore part of the syringe chamber.

Fig. 3 shows in longitudinal elevation the capsule having both ends obturated by the requisite stoppers.

Fig. 4 shows in longitudinal section the cylindro-frustoconically shaped stopper removed from the fore end of the capsule.

Fig. 5 shows in longitudinal section, on a larger scale, the singletwin-point needle of known construction provided with a socket or union by which it can be held securely upon the fore extremity of the syringe Fig. 6 shows in longitudinal section, also on a larger scale, the cap-shaped union used for readily uniting in axial alignment two similar needles: an inner perforating needle and an outer injecting needle for use on a syringe having a specially constructed nozzle for receiving said needles.

Fig. 7 shows in elevation and partial section, on a larger scale, the special construction of the nozzle of the syringe adapted for receiving the cap-shaped needle-holder, as represented in Fig. 6, the capsule being omitted.

Like references designate like parts throughout these several figures.

Reference being first had to Figs. 3 and 4, the cylindrical capsule preferably made of glass containing the liquid to be injected is obturated tightly at either end by a stopper preferably made of soft india rubber or equivalent resilient and compressible material easy to be perforated. The rear stopper 2 is so inserted into the corresponding end of the capsule as to have its top face flush with the edge of said capsule when in normal position; said stopper is cylindrically shaped and formed with two or more circular grooves or flutings 3. It is of known form and acts as a piston for forcing out the liquid to be injected when pushed onward by the syringe rod. The fore stopper, more clearly shown in Fig. 4, affords the composite shape of a cylinder 4 having an enlarged terminal portion so as to provide a shoulder the purpose of which is to bear against the edge of the capsule, said enlarged portion being in the shape of a frustum 6 having adjacent its larger base a cylindrical portion 5 forming the said shoulder the diameter of which is equal to the external diameter of the capsule, the smaller base of such frustum having a very reduced diameter and being slightly recessed so as to provide a shallow cup 7 the purpose of which is to guide and facilitate the penetration of the hollow needle which has to perforate the said stopper. The opposite face of this stopper is formed with a shallow recess 8 for receiving and guiding the needle that passes through same. Said fore stopper 4—5—6 is moreover formed on a portion of its cylindrical rear part 4 from its rear base with a longitudinal kerf 4ª the purpose of which will appear hereafter.

The syringe used in connection with this capsule such as shown in Figs. 1 and 2, is constituted by a hollow cylindrical body 9 cut away longitudinally on a portion of its length as at 10, Fig. 2, and hollowed to provide a rectangular recess 11 having a width slightly larger than the capsule diameter and a length slightly smaller than the capsule length so as to permit the ready insertion thereof within the body of the springe. One extremity 12 of said body constituting the nozzle of the syringe is frustoconically shaped externally and has a bored extension 13 also of frustoconical shape but of reduced diameter. The hollow portion 14 of the nozzle 12 which communicates with the bore of the extension 13 is also frustoconically shaped and has the same size as the frustum 6 of the perforatable stopper which obturates the fore end of the capsule. Opposite to the said nozzle 12, the hollow body 9 of the syringe is closed by a circular bottom secured to a base 15; said bottom and said base are centrally bored for guiding the rod 16 of a piston which is externally terminated by a circular flat knob 17.

Around the bottom of the body 9 is seated a ring 18 and adjacent to such ring are clamped a pair of curved wings 19 of usual construction extending outwardly from said body 9 and acting as finger-rests. The end of the rod 16 opposite to the knob 17 is provided with a washer 20 beyond which projects a nipple 21; this washer has a diameter slightly smaller than the internal diameter of the glass bulb 1. The stroke of the rod 16 is so reckoned as to cause the nipple 21 to come flush with the free edge of the collar 22 and the washer 20 to contact with the inner face of the bottom of the body 9 when the said rod is pulled outwardly to a maximum whereby the backward stroke is limited and the recess 11 formed in the body 9 of the syringe is entirely unmasked for permitting the insertion of the capsule into said recess.

As illustrated in Fig. 2, when it is desired to insert the capsule 1 into the body of the syringe, as above described, same must first be held obliquely with its compressible cylindro-frustoconical fore stopper directed towards the frustoconical end portion 14 of the recess so as to be engaged thereinto before the remainder of the capsule. On the said stopper 4—5—6 fits the correspondingly shaped cavity 14 of the nozzle 12, the whole of the capsule may be pushed home into the recess 11. When thus in operating position, the capsule 1 has its longitudinal axis exactly in alignment with the axis of the rod 16 of the syringe whereby, owing to the slight push exerted by the fore stopper due to its compressibility, the rear edge of the capsule will rest upon the free edge of the collar 22 and the rear stopper will substantially engage the nipple 21. The capsule is then ready for the injection operation which is performed by pushing inwardly the knob 17 so as to cause the syringe rod 16 to shift the rear stopper 2 lengthwise and to travel onward throughout the length of the capsule 1, said stopper 2 acting as a fluted liquid-tight piston for expelling the liquid through the hollow needle.

To enable the liquid contained in the capsule to be thus forced out and injected, it is necessary a short time before proceeding with the injection, to perforate its cylindro-frustoconically shaped fore stopper. To that effect, a twin-point needle of known construction such as the one represented in Fig. 5 may be used. This single needle comprises a sharp-ended tubular member 25—26 provided substantially midway of its length with a metal socket or union 24 welded or otherwise suitably secured to said tubular member 25—26; the internal shape of said socket 24 is so reckoned as to accurately fit the bored tapering extension 13 of the nozzle 12 of the syringe whereby, by introducing the tubular portion 25 of the needle into the bore of said extension 13 and forcing the latter into the socket 24, the said needle perforates the fore stopper 4—5—6 of the capsule axially thus permitting the liquid therein contained to be forced out through the said tubular portion 25 and its fore extension 26, which, as above stated, is sharp-cut so as to permit its easy insertion into the tissue or other surface into which the injection of the liquid has to be performed. For giving the hand of the operator a better grip on the socket 24, its external surface is advantageously knurled, as shown, or otherwise suitably roughened.

When it is desired to use an improved syringe such as has just been described and represented in Figs. 1 and 2 for dental purposes wherein the operation has generally to be carried out by means of interchangeable needles for cleansing and replacing purposes, the nozzle of the syringe carrying the needle-holder is advantageously formed as illustrated in Fig. 7 for receiving such a needle-holder as shown in Fig. 6. In such embodiment, each tubular member 25 and 26 of the needle is terminated at one end by a flattened head 27 made of a malleable material, said two heads 27 being held in juxtaposed relation by being compressively accommodated within a cavity 35 formed between the two adjacent interengaging parts 28 and 31 of a cap-shaped union the male portion of which has a screw-threaded portion 33 whereby the two tubular members 25 and 26 are retained in accurate alignment as though they appertained to a one-piece solid needle.

According to the embodiment shown in Fig. 7, the extension 13 of the nozzle 12 is done away with and in lieu thereof there is provided in the end portion of the body 9 of a syringe a frustoconical cavity 29 the peripheral edge of which is formed with two diametrically opposed notches or nicks 30, 30. Within said cavity is slidably engaged the frustoconically shaped rear portion 31 of the aforesaid union carrying the double needle 25—26, said frustum 31 having two upright gudgeons 32, 32 that engage the notches 30, 30 thus creating a kind of a bayonet joint which precludes any possibility of the said needle union 28—31 rotating when its female member 28 is screwed up upon its male member 33 or unscrewed therefrom for instance for replacing the fore part 26 of the needle that may have become contaminated. The male and female members of the needle-union are bored axially at 34 so as to accommodate the needle 25—26; further the male member is formed with a shoulder 36 preferably knurled for ensuring a better grip on the union when it is desired to disengage the needle attachment from the nozzle of the syringe, particularly for removing the capsule whose contents have been exhausted and for substituting a fresh one.

According to the embodiment of cap-shaped needle-holder shown in Fig. 6, the two interchangeable needle members 25 and 26 are similar to each other and have their flattened ends held in juxtaposed relation. On the contrary, according to the embodiment shown in Fig. 7, the needle member 25 adapted for perforating the rubber stopper 4—5—6 has a flattened head 40 upon which rests the malleable enlarged head 27 of the needle member 26.

To permit the capsule 1 to be readily removed from the recess 11 formed in the syringe body, the latter is advantageously provided on its inner wall (see Fig. 2) with a flat spring 42 fixedly secured at one of its ends 43 in the vicinity of the annular portion 22 and provided at its other end with a small operating knob 41 projecting outwardly of the said body 9 whereby by pressing upon said knob it becomes possible to slightly force the capsule 1 out of the recess 11 and thus to start its withdrawal. If desired, a shallow depression may be formed in the inner wall of the syringe body 9 for accommodating the flat spring 42 when in its normal position.

As above stated, the fore stopper 4—5—6 which tightly obturates the capsule is advantageously formed on a portion of its cylindrical part 4 with a longitudinal kerf 4$^a$ (see Fig. 4) which extends from its rear base. The function of this kerf is merely to permit the inside of the capsule to temporarily communicate with the atmosphere of the sweating flask within which said capsule or a plurality of such capsules are disposed for sterilizing and filling purposes. By placing said capsules in the flask with their fore stoppers so partly withdrawn as to cause the fore end of their respective kerfs to slightly project out of the edge of the capsules, their inner capacity can freely communicate with the atmosphere of the flask in which has been placed the liquid to be enclosed in the capsules. Thanks to this arrangement, the inside of all the capsules are simultaneously sterilized by the liquid vapours and subsequently filled by the said liquid which can penetrate thereinto due to the vacuum produced by refrigeration. Once each capsule has been thus substantially filled with liquid, all that is necessary is to slightly push inward its fore stopper so as to interrupt the communication of the inner capacity with the atmosphere through the kerf whereby the liquid is entirely protected from any contamination irrespective of the time during which it will be thus kept in the capsule.

As will be readily understood, the fore resilient stopper of the capsule which is adapted to be perforated right through by the injection needle as has been explained might afford, instead of a cylindro-frustoconical shape as above set forth, a cylindro-hemispherical shape merely by substituting a hemispherical protuberance for its frusto-conical fore part 6 in which case the hollow terminal portion 14 of the syringe body instead of being frustoconical would naturally require to be hemispherical. Other convergent shapes could also be provided for the protuberance of the fore stopper and fore end of the syringe recess.

Further, as will also be readily understood, instead of being made of india rubber, the stoppers might be made of any equivalent soft and resilient material easy to perforate by the hollow needle and, moreover, such stoppers whatever their constitution is might be protected from the direct contact of the liquid to be injected by any approved means such for instance as metallization.

What we claim and desire to secure by Letters Patent is:—

1. A syringe, comprising, in combination, an elongated recessed rigid body, with the front end of the recess of frusto-conical shape, a nozzle at the front end of the body, an elongated cylindrical capsule for containing liquid to be injected, an opening in the body permitting the capsule to be removably housed within the recess of the body, front and rear resilient stoppers hermetically closing the capsule, the front stopper being shaped to have its front part snugly fit the front end of the recess and to be perforated by an injection needle, means to engage the rear stopper and push it forward to drive liquid out of the capsule, and a spring actuated knob on the body for starting withdrawal of the capsule.

2. A syringe comprising in combination an elongated open body having a forwardly frusto-conical recess, an elongated capsule yieldingly and firmly retainable in said recess, the entrance of the latter being slightly wider than the diameter of said capsule and slightly shorter than the length of said capsule, a rear stopper slidably fitting said capsule and acting as a plunger for expelling the contents therefrom, a syringe rod movably carried through said body and provided with a head engageable with said rear stopper for forcing the latter inwardly of said capsule, finger rests fixedly carried by said body, a resilient fore stopper obturating the forward end of said capsule and formed with a projecting frusto-conical end cooperating with the frusto-conical portion of said recess to hold the capsule compressively centered when seated thereupon, said fore stopper having a longitudinal kerf extending about part way only of that portion of the stopper which is surrounded by the capsule, spring means associated with said body for initiating the withdrawal of the capsule, said body being formed exteriorly with an outwardly flaring socket having notches in the border thereof and permanently communicating through an axial aperture with said recess, and a needle holder including bored interengaging male and female members one of said members having a smooth slightly tapering portion fitting said socket and being provided with rigidly projecting pins entering the notches in the border of said socket, said male and female members being constructed cooperatively to form an enlarged chamber, and a removable oppositely pointed needle made of two aligned pieces provided with juxtaposed heads, said heads fitting within said enlarged chamber and the opposite portions of said needles extending through the bores in said members, the rearward point of said needle being adapted to perforate the fore stopper when the needle holder is pushed into its socket, and the forward part of said needle being adapted to penetrate into the tissue.

3. A syringe comprising in combination, an elongated recessed rigid body with the front end of the recess of convergent shape, a nozzle at the front end of the body, an elongated cylindrical capsule for containing liquid to be injected, an opening in the body permitting the capsule to be removably housed within the recess of the body, front and rear resilient stoppers hermetically closing the capsule, the front stopper being correspondingly shaped to have its front part fit with resilient pressure the front end of the recess to be selfcentered therein, and to be perforated by an injection needle, and means to engage the rear stopper and push it forward to drive liquid out of the capsule.

4. In a syringe, a body having a capsule-receiving space defined between side and end walls, the former being open to said space to give access for the lateral introduction of a capsule, one end wall being perforated for the introduction of a needle and the other being perforated for the reception of a plunger rod, said capsule comprising a tube having a plug slidably fitting one end and a stopper at the other having a projecting elastic convergent portion, one perforated end wall of said body being correspondingly convergently shaped to form a seat for receiving the said projecting end of said stopper for centering said capsule in said body, said capsule when unrestrained, being of a length slightly greater than that of the capsule-receiving space, and being held in place solely through the reactive pressure of said elastic stopper against the opposite end walls of said space.

5. A syringe comprising a body having a recess and a side opening giving access to said recess, an end wall of said recess being convergent toward the end of said body forming a seat, said wall being axially perforated for receiving a needle, a plunger rod at the opposite end of said body adapted to move axially about said recess, a capsule comprising a tubular part having a plug slidably fitting one end and an imperforate elastic stopper at the other end having a projecting convergent portion, adapted to seat in the convergent end of said recess for selfcentering said capsule in said body, the normal unrestrained length of said capsule being slightly greater than that of the capsule-receiving recess, said capsule being retained within said recess under compression, solely through the reactive pressure of the elastic stopper against the end walls of said recess.

6. A capsule adapted to contain medicament comprising in combination, a tube, a plug slidably fitted in one end of the tube and a resilient pierceable imperforate stopper hermetically closing the opposite end of the body including a projecting convergent portion adapted to conform to a correspondingly shaped seat in a syringe device in which said capsule may be used.

7. A capsule adapted to contain medicament comprising a tube, a plug slidably fitted in one end of the tube, and a resilient pierceable imperforate stopper hermetically closing the opposite end of the tube having a cylindrical part fitting within the bore of the tube, a part forming an annular shoulder seating against the end of the tube, and a projecting convergent portion.

8. A capsule adapted to contain medicament comprising a tube, a plug slidably fitted in one end of the tube, and a resilient pierceable imperforate stopper hermetically closing the opposite end of the tube having a cylindrical part fitting within the bore of the tube, a part forming an annular shoulder seating against the end of the tube, and a projecting convergent portion, said convergent portion having a recessed tip.

In testimony whereof we have signed our names to this specification.

JULES COURNAND.
RENÉ COURNAND.